(12) United States Patent
Hemmler (10) Patent No.: US 10,538,135 B2
(45) Date of Patent: Jan. 21, 2020

(54) AXLE SUSPENSION

(71) Applicant: Liebherr-Werk Ehingen GmbH, Ehingen/Donau (DE)

(72) Inventor: Gerhard Hemmler, Erbach (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 146 days.

(21) Appl. No.: 15/658,505

(22) Filed: Jul. 25, 2017

(65) Prior Publication Data

US 2018/0022177 A1 Jan. 25, 2018

(30) Foreign Application Priority Data

Jul. 25, 2016 (DE) .................. 20 2016 004 580 U (51) Int. Cl.
*B60G 9/02* (2006.01)

(52) U.S. Cl.
CPC .............. *B60G 9/025* (2013.01); *B60G 9/02* (2013.01); *B60G 9/022* (2013.01); *B60G 2200/314* (2013.01); *B60G 2200/315* (2013.01); *B60G 2200/32* (2013.01); *B60G 2200/324* (2013.01); *B60G 2200/34* (2013.01); *B60G 2200/341* (2013.01); *B60G 2204/423* (2013.01); *B60G 2204/4232* (2013.01); *B60G 2300/06* (2013.01)

(58) Field of Classification Search
CPC .... B60G 9/025; B60G 9/022; B60G 2200/32; B60G 2300/06; B60G 2200/341; B60G 2204/4232; B60G 2200/34; B60G 2200/324; B60G 2200/315; B60G 2200/314; B60G 2204/423; B60G 9/02; B60G 2204/19

See application file for complete search history.

(56) References Cited

U.S. PATENT DOCUMENTS

| | | | | |
|---|---|---|---|---|
| 2,660,254 | A | * | 11/1953 | Kolbe ...................... B60G 3/24 180/360 |
| 2,705,152 | A | * | 3/1955 | Walter ................... B60G 5/053 280/680 |
| 2,796,943 | A | * | 6/1957 | Rolt ................... B60K 17/3465 180/249 |
| 2,806,542 | A | * | 9/1957 | Scherenberg et al. ... B60G 3/24 180/358 |
| 2,807,475 | A | * | 9/1957 | Post ................. B60G 17/01925 280/5.508 |
| 2,818,128 | A | * | 12/1957 | Uhlenhaut et al. ...... B60G 3/20 180/358 |
| 3,414,290 | A | * | 12/1968 | Wilfert ..................... B60G 3/02 280/124.111 |
| 3,572,746 | A | * | 3/1971 | Mueller ................... B60G 9/02 280/124.112 |

(Continued)

*Primary Examiner* — Paul N Dickson
*Assistant Examiner* — Timothy Wilhelm
(74) *Attorney, Agent, or Firm* — Dilworth & Barrese, LLP (57) ABSTRACT

The invention relates to an axle suspension on a vehicle frame, comprising: an axle bracket which in its longitudinal direction is arranged transversely to the vehicle frame and at its longitudinal ends each is provided with a wheel carrier, a pendulum support which is connected with the axle bracket via a swivel bearing and is accommodated in a self-aligning bearing attached to the vehicle frame, wherein the swivel bearing has a swivel axis which extends parallel to the longitudinal axis of the vehicle frame.

21 Claims, 10 Drawing Sheets

(56) References Cited

U.S. PATENT DOCUMENTS

| | | | | |
|---|---|---|---|---|
| 3,582,104 A * | 6/1971 | Eggert, Jr. | ............... | B60G 9/02 280/124.112 |
| 3,652,101 A * | 3/1972 | Pivonka | ................... | B60G 9/02 280/6.154 |
| 3,953,040 A * | 4/1976 | Unruh | ................... | B60G 17/005 280/6.151 |
| 4,036,528 A * | 7/1977 | Langendorf | ............. | B60G 9/02 298/17 S |
| 4,091,739 A * | 5/1978 | Theurer | ................... | B61F 5/301 105/165 |
| 4,152,004 A * | 5/1979 | Schroder | ................. | B60G 9/02 280/6.154 |
| 4,161,322 A * | 7/1979 | Ekeborg | ................... | B60G 9/02 280/124.112 |
| 4,205,864 A * | 6/1980 | Hoefer | ..................... | B60G 9/02 280/124.112 |
| 4,529,224 A * | 7/1985 | Raidel | .................... | B60G 9/003 280/124.109 |
| 4,669,566 A * | 6/1987 | Bergius | .................... | B60G 9/02 180/41 |
| 4,804,205 A * | 2/1989 | Parsons | ................... | B60G 5/03 180/352 |
| 4,953,472 A * | 9/1990 | Tutzer | .................... | B61B 13/06 105/144 |
| 5,046,577 A * | 9/1991 | Hurlburt | ................. | B60G 9/02 180/266 |
| 5,226,801 A * | 7/1993 | Cobile | ................... | B60G 13/00 417/231 |
| 5,458,359 A * | 10/1995 | Brandt | .................... | B60G 9/00 180/349 |
| 5,611,555 A * | 3/1997 | Vidal | ...................... | B60G 3/14 180/215 |
| 5,639,119 A * | 6/1997 | Plate | ....................... | B60G 9/02 280/124.112 |
| 5,884,723 A * | 3/1999 | Kleinschmit | .......... | B60K 17/16 180/360 |
| 5,927,424 A * | 7/1999 | Van Den Brink | ....... | B60G 9/02 180/216 |
| 5,993,065 A * | 11/1999 | Ladzinski | ................ | B60G 3/01 384/145 |
| 6,068,275 A * | 5/2000 | Chino | .................... | B60G 9/02 280/124.112 |
| 6,098,551 A * | 8/2000 | Kern | ....................... | B60G 5/04 105/218.2 |
| 6,203,027 B1 * | 3/2001 | Ishikawa | ................. | B60G 9/02 280/6.154 |
| 6,217,047 B1 * | 4/2001 | Heyring | ................... | B60G 9/02 280/124.106 |
| 6,328,322 B1 * | 12/2001 | Pierce | .................... | B60G 7/001 280/124.131 |
| 6,820,877 B1 * | 11/2004 | Ichimura | ................. | B60G 9/02 180/89.13 |
| 6,851,689 B2 * | 2/2005 | Dudding | ................. | B60G 9/00 280/124.128 |
| RE39,477 E * | 1/2007 | Nellers | .................... | B60G 9/02 280/124.112 |
| 7,168,718 B2 * | 1/2007 | Svartz | .................... | B60G 9/025 280/124.13 |
| 7,234,713 B1 * | 6/2007 | Vander Kooi | ........... | B60G 9/00 280/124.106 |
| 7,467,683 B2 * | 12/2008 | Malvestio | ................ | B60G 9/02 180/252 |
| 7,475,892 B2 * | 1/2009 | Dudding | .................. | B60G 7/04 280/124.11 |
| 7,708,488 B2 * | 5/2010 | Kunze | .................... | B60G 7/005 403/149 |
| 7,763,825 B2 * | 7/2010 | Katae | ..................... | B60B 35/08 180/437 |
| 8,322,736 B2 * | 12/2012 | Bowers | ................... | B60G 9/02 180/348 |
| 8,328,210 B2 * | 12/2012 | English | .................... | B60G 9/00 280/124.106 |
| 8,336,659 B2 * | 12/2012 | Pintos Pintos | ......... | B60K 25/10 180/165 |
| 8,544,864 B2 * | 10/2013 | Molitor | ................... | B60G 7/001 280/124.106 |
| 8,708,594 B2 * | 4/2014 | Brunneke | .............. | B60G 7/005 280/124.11 |
| 8,910,960 B2 * | 12/2014 | Fowler | ................... | B60G 7/001 280/124.11 |
| 9,010,782 B2 * | 4/2015 | Kiselis | .................... | B60G 9/00 280/124.106 |
| 9,511,642 B2 * | 12/2016 | Scheper | ................. | B60G 7/008 |
| 9,616,725 B2 * | 4/2017 | Kuroda | .................. | B60G 7/001 |
| 9,969,252 B2 * | 5/2018 | Engblom | ................ | H02K 5/00 |
| 2007/0059146 A1 * | 3/2007 | Bitter | ..................... | B66F 9/0655 414/685 |
| 2009/0160151 A1 * | 6/2009 | Gaumer | ................. | B60G 7/001 280/124.1 |
| 2014/0062049 A1 * | 3/2014 | Bandy | .................... | B60G 9/022 280/124.116 |
| 2017/0113503 A1 * | 4/2017 | Wolf | ..................... | B60B 35/004 |

\* cited by examiner

AXLE SUSPENSION

BACKGROUND OF THE INVENTION

The present invention relates to an axle suspension on a vehicle frame, in particular an axle suspension for a mobile working machine or a mobile crane.

An axle suspension typically describes the axle bracket connecting the two wheel carriers of a vehicle and their coupling to a vehicle frame. It is necessary that due to the changing level of a subsurface the suspension be movable with respect to a vehicle frame. Typically, there are provided damping elements in the form of so-called spring struts which provide for a compression or rebound of the axle bracket with the wheel carriers with respect to a vehicle frame. In general, an axle suspension comprises two lower longitudinal links extending substantially in longitudinal vehicle direction and two upper diagonal links. The lower longitudinal links are arranged on the underside and the diagonal links on the upper side of the axle bracket. The axle bracket itself is transversely oriented in longitudinal direction. In combination, the lower longitudinal links and the upper diagonal links absorb forces from the moments acting on the axle bracket as a result of the drive or on braking of the vehicle. Due to their inclined position, the diagonal links arranged on the upper side of the axle bracket not only absorb the forces produced in longitudinal direction, but also the forces produced in transverse direction and introduce the same into the vehicle frame.

Alternatively, the upper and the lower longitudinal links can each be designed parallel to each other. The support of the axle or axle bracket in transverse vehicle direction then can be effected by a transverse link or Panhard rod. A detailed description of a conventional axle suspension will be made in the discussion of FIGS. 1 and 2.

As explained already, acting against a torque caused by the drive or by braking hence requires that both on the side of the axle or axle bracket facing the vehicle frame and on the far side steering rods are provided, which however prevent a further lowering of the vehicle frame in direction of the axle bracket. The lower end of the vehicle frame accordingly cannot extend in direction of the axle bracket, as the steering rods articulated on the upper side of the axle bracket have a certain space requirement.

In certain vehicle types, however, in particular in a mobile crane, it is advantageous when the height of the vehicle frame can be increased without limitation of the ground clearance, without increasing the weight of the vehicle frame, in order to achieve a maximum strength as well as stiffness by increasing the moment of inertia and resistance without exceeding the maximum vehicle height.

Furthermore, it is advantageous to provide an axle suspension which as compared to a conventional axle suspension creates a more stable vehicle with the same vehicle weight and thereby permits a higher lifting capacity. Alternatively, a lower weight of the vehicle might be desirable with the same stability.

SUMMARY OF THE INVENTION

It is the objective of the present invention to overcome the problems set forth above. This is accomplished with an axle suspension which comprises all features herein.

Accordingly, the axle suspension according to the invention comprises an axle bracket on a vehicle frame, which in its longitudinal direction is arranged transversely to the vehicle frame and at its longitudinal ends each is provided with a wheel carrier. The wheel carrier can be firmly or steerably mounted at the end of the axle bracket. The axle suspension is characterized in that it furthermore includes a pendulum support which is connected with the axle bracket via a swivel bearing and is accommodated in a self-aligning bearing attached to the vehicle frame, wherein the swivel bearing includes a swivel axis which extends parallel to the longitudinal axis of the vehicle frame.

The pendulum support is mounted on the side of the axle bracket facing the vehicle frame via a swivel bearing. As the swivel bearing has merely one swivel axis which extends in longitudinal direction of the vehicle frame, a movement of the axle bracket relative to the pendulum support only is possible by lateral swiveling.

According to the requirements, the pendulum support furthermore is accommodated in a self-aligning bearing attached to the vehicle frame. The moment which results from driving or braking and acts on the axle mounts is divided into forces which by means of lower longitudinal links in combination with the self-aligning bearing accommodating the pendulum support can be introduced into the vehicle frame. This construction is advantageous as compared to the prior art, as the forces to be applied on introduction of the moment into the vehicle frame are smaller than in conventional axle suspensions. What is characteristic for the magnitude of the forces obtained on introduction of the torque into the vehicle frame is the vertical distance of the lower links to the point of the introduction of force in the upper region of the axle suspension (prior art: upper diagonal links; invention: self-aligning bearing of the pendulum support). As the self-aligning bearing of the pendulum support has a larger distance to a side of the axle bracket facing the vehicle frame than conventional upper steering rods (upper longitudinal links or upper diagonal links) the force obtained here, which is produced at a certain torque of the axle bracket, is smaller. It thereby is possible to design the individual components which are required to introduce a torque into the vehicle frame less stable, wherein the sheet thickness of the vehicle frame can also be reduced at the force introduction points. The reason is that the forces to be introduced into the vehicle frame are smaller.

According to an optional modification of the invention the vehicle frame includes an opening in its frame underside, which penetrates the pendulum support. The pendulum support arranged on the side of the axle bracket facing the vehicle frame accordingly extends in direction of the vehicle frame and passes through the opening of the vehicle frame on its frame underside. It thereby is possible to further lower the lower end of the vehicle frame in direction of the axle bracket and thus create a larger frame height. In the introductory part of the description it has been explained already that in certain vehicle types, in particular in a mobile crane, it is advantageous when the height of the vehicle frame can be increased without limitation of the ground clearance, in order to achieve a maximum strength as well as stiffness by increasing the moment of inertia and resistance without exceeding the maximum vehicle height.

In a rebounded condition, the swivel bearing connected with the axle bracket and the self-aligning bearing attached to the vehicle frame preferably are arranged on different sides of the opening of the frame underside. In other words, the self-aligning bearing hence is attached to the vehicle frame in the interior of the vehicle frame, whereas the swivel bearing is arranged outside the vehicle frame. The pendulum support connects these two points with each other.

According to another preferred variant of the invention the self-aligning bearing is designed to shiftably accommodate the pendulum support along the longitudinal direction of the pendulum support. This is advantageous, because during a compression the axle bracket pushes in direction of the vehicle frame and during a rebound pushes against the vehicle frame. Depending on the movement, the pendulum support protrudes farther or less far into the interior of the vehicle frame, so that a slidable accommodation of the pendulum support in the self-aligning bearing is advantageous.

Due to the connection of the pendulum support with the axle bracket via the swivel bearing, the axle bracket preferably is pivotable relative to the pendulum support only about a swivel axis parallel to the longitudinal direction of the vehicle frame. Pivoting about another swivel axis is not possible and also would prevent the diversion of a torque acting on the axle bracket by braking or accelerating.

According to another optional modification of the invention, the axle suspension furthermore comprises lower steering rods which with one of their ends are articulated to the axle bracket and with the other end are connected with the vehicle frame, wherein preferably the lower steering rods are articulated to the side facing away from the vehicle frame.

It can be provided that the lower steering rods are longitudinal links or diagonal links. The advantage of the lower steering rods designed as diagonal links is that there is no need to provide a separate transverse link.

According to another preferred embodiment of the invention the axle suspension furthermore comprises at least one transverse link, in order to limit a transverse offset of the axle bracket relative to the vehicle frame, wherein the transverse link preferably is a Panhard rod. The transverse link with one of its ends is connected with the vehicle frame and with the other end with the axle bracket.

According to an optional modification of the invention the self-aligning bearing for the pendulum support includes a bearing, in particular a plain bearing between pendulum support and self-aligning bearing, for example the same can also include a ball or roller guide. It thereby becomes possible that the pendulum support can be slidably accommodated in the self-aligning bearing.

According to an advantageous variation of the invention the pendulum support is arranged at a point of the axle bracket designed particularly stiff in longitudinal direction of the axle bracket, i.e. in the case of a non-driven axle preferably centrally by means of the swivel bearing, in the case of a driven axle eccentrically, i.e. outside the region of the drive unit.

Preferably, the swivel axis of the swivel bearing extends in a region between vehicle frame and axle bracket or penetrates the axle bracket. For example, the swivel bearing can have a Y-shaped branching, so that the two legs projecting from each other partly accommodate the axle bracket. With a corresponding attachment it then is possible that the swivel axis extends through the axle bracket. The mounting space thereby is further minimized by the swivel bearing in direction of the underside of the vehicle frame, so that the opening on the vehicle frame underside can be reduced to a minimum.

According to another embodiment of the present invention, a plurality of pendulum supports with their associated swivel bearing and self-aligning bearing are provided, wherein the plurality of pendulum supports each are arranged above the axle bracket via their swivel bearing. In other words, it hence is possible that more than one pendulum support is connected with the axle bracket via an associated swivel bearing. This is advantageous for example when in the vehicle frame in a region above the center of the axle bracket a motor is to be arranged, which would collide with the pendulum support penetrating into the vehicle frame. It can then be provided to provide two pendulum supports, which each are arranged offset in direction of the end portions of the axle bracket and penetrate into the vehicle frame offset in transverse direction of the vehicle frame or are disposed outside the vehicle frame.

According to an advantageous embodiment of the invention, the axle suspension furthermore comprises at least one protection device for the pendulum support, which encloses the portion of the pendulum support to be shifted by the self-aligning bearing, wherein the protection device preferably is at least one bellows. It can be provided that the bellows is arranged at the opening edge in the underside of the vehicle frame and extends towards the self-aligning bearing, and that preferably a second bellows encloses the pendulum support above the self-aligning bearing.

According to another optional modification of the invention, the axle bracket of the axle suspension according to the invention can be a driven or a non-driven as well as a steered or non-steered axle.

The invention also comprises a mobile crane with an axle suspension according to any of the variants presented above.

BRIEF DESCRIPTION OF THE DRAWINGS

Further features, advantages and details will become apparent with reference to the following detailed description of the Figures, in which.

DESCRIPTION OF THE PREFERRED EMBODIMENTS

Figure 1:
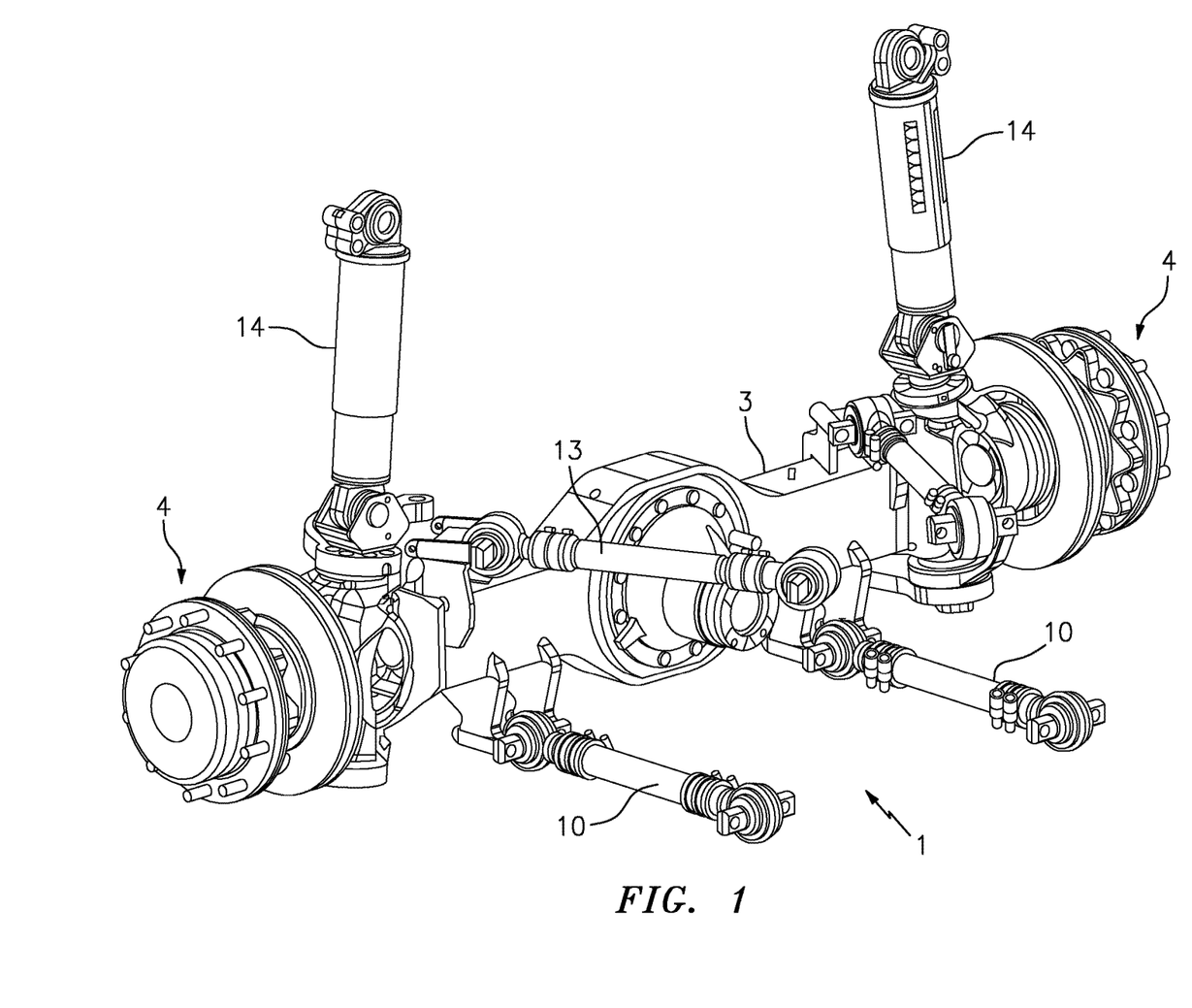
FIG. 1: shows an axle suspension according to the prior art.

FIG. 1 shows an axle suspension from the prior art. The upper diagonal links 13 are shown here at various mounting angles. The diagonal links 13 extend from the outer side of the axle 3 to an inner articulation point at the vehicle frame (not shown). The lower boundary for the vehicle frame depends on the position of the diagonal links 13. The same have a certain vertical distance to the axle bracket 3, in order to keep the forces in the diagonal links 13 controllable. To control a torque of the axle bracket 3 into the vehicle frame (not shown), the vertical distance of the lower longitudinal links 10 to the upper diagonal links 13 is essential. As the ground clearance in a vehicle, in particular in an all-terrain or mobile crane, is of great importance and the same depends on the position of the lower longitudinal links 10, the upper diagonal links 13 typically are arranged relatively high. However, this is the reason why the underside of the vehicle frame must have a certain distance to the axle bracket 3. At its ends in longitudinal direction, the axle bracket 3 each has a wheel carrier 4. In addition, damping elements 14, typically in the form of spring struts, are connected with the axle bracket 3, in order to provide for a compression of the axle bracket 3 in direction of the vehicle frame. As the longitudinal and transverse forces acting on the axle bracket 3 are absorbed by the lower longitudinal links 10 and the upper diagonal links 13, these damping elements 13 can be designed relatively thin.

Figure 2:
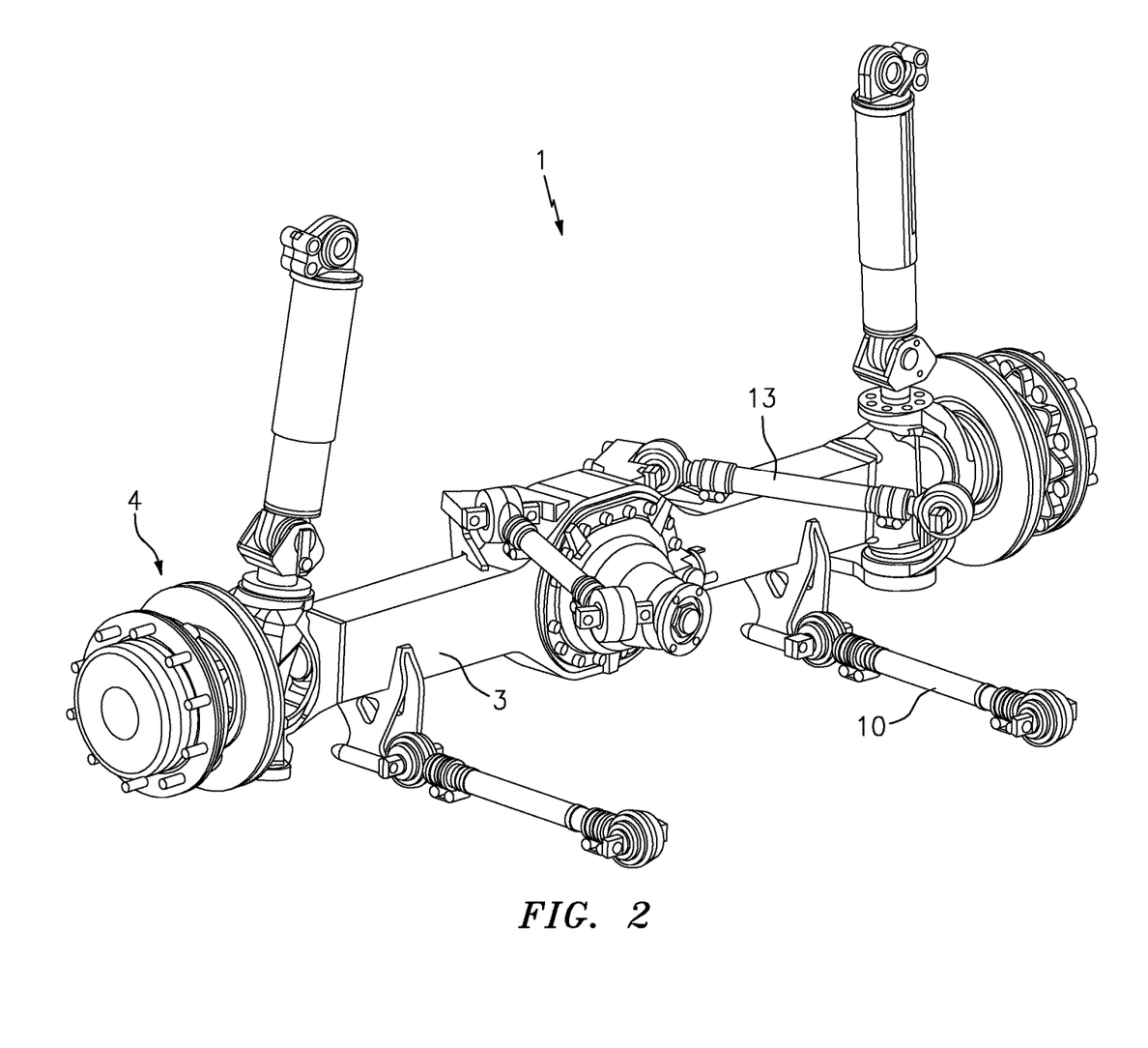
FIG. 2: shows a further axle suspension according to the prior art.

FIG. 2 shows an axle suspension likewise known from the prior art, wherein in contrast to the axle suspension shown in FIG. 1 the upper diagonal links 13 extend from an articulation point in the region of the center of the axle bracket 3 to an outer articulation point at the vehicle frame (not shown).

Figure 3:
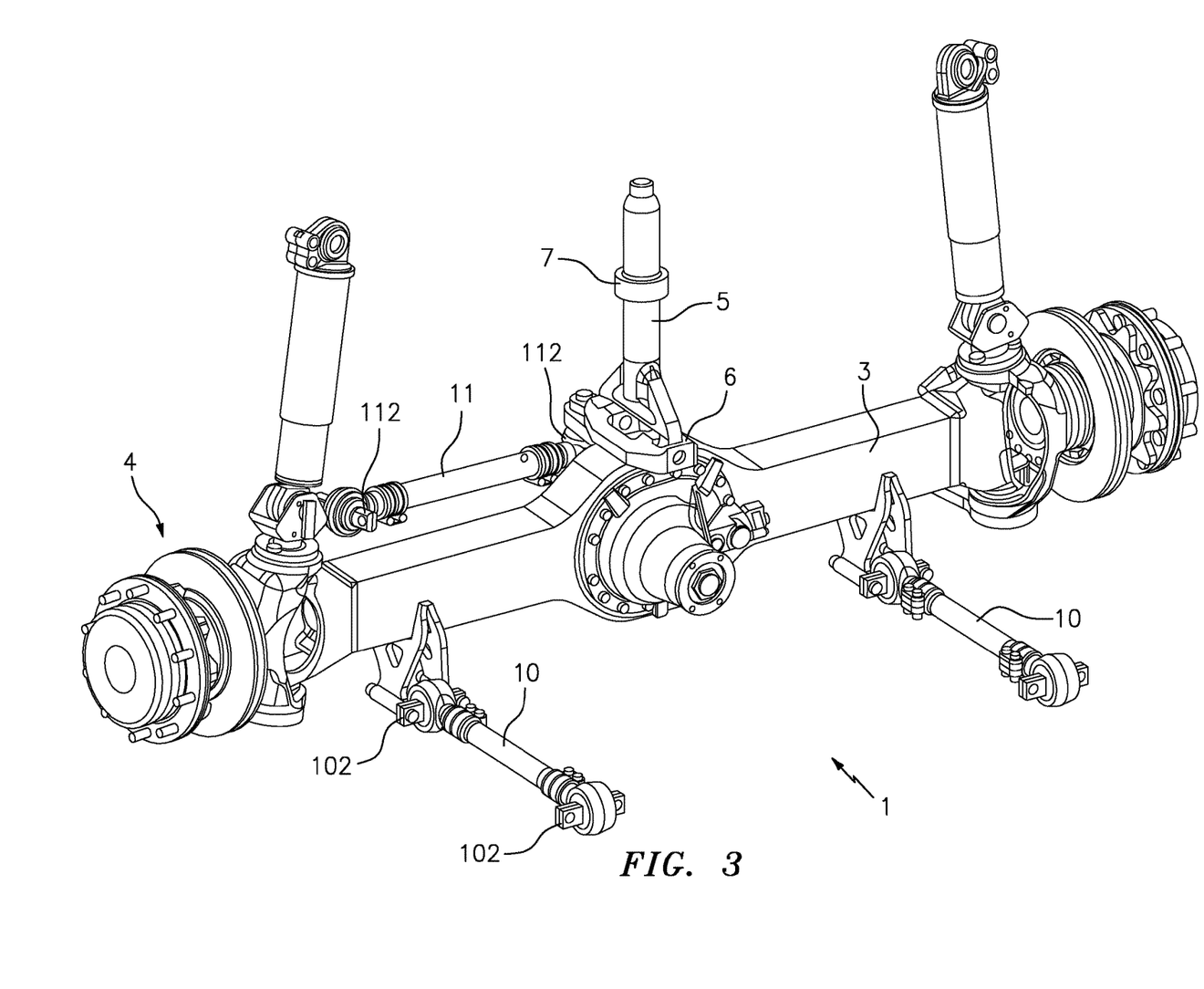
FIG. 3: shows a design of a steered drive axle according to the invention.

FIG. 3 shows an embodiment of the axle suspension according to the invention. According to the invention, the function of the upper diagonal links 13 from the prior art should be taken over by components which allow the vehicle frame to occupy more space in direction of the axle bracket 3. This is accomplished with the pendulum support 5 and the transverse link 11, which also is known as Panhard rod. It thereby is possible to further lower the lower end of the vehicle frame in direction of the side of the axle bracket 3 facing the vehicle frame, wherein this requires merely a small opening in the underbody of the vehicle frame, which is penetrated by the pendulum support 5. The vehicle frame altogether can be increased and be utilized better. Preferably, for the required opening in the bottom chord of the vehicle frame an assembly opening present already might be utilized, which already is present for example for mounting internal components such as the articulated shaft or the like.

Like in the prior art, the longitudinal links 10 are fixed with the vehicle frame and the axle bracket 3 via articulation points 102 or bearing points 102. The same applies for the transverse link 11, which in FIG. 3 is designed as Panhard rod and is connected with the axle bracket 3 via an articulation point 112 and with the vehicle frame (not shown) via another articulation point 112.

The pendulum support 5 is arranged on the axle bracket 3 by means of a swivel bearing 6. The swivel bearing 6 has a swivel axis which is oriented substantially in longitudinal direction of the vehicle frame. The pendulum support 5 is accommodated in a self-aligning bearing 7 which is firmly connected with the vehicle frame.

Figure 4:
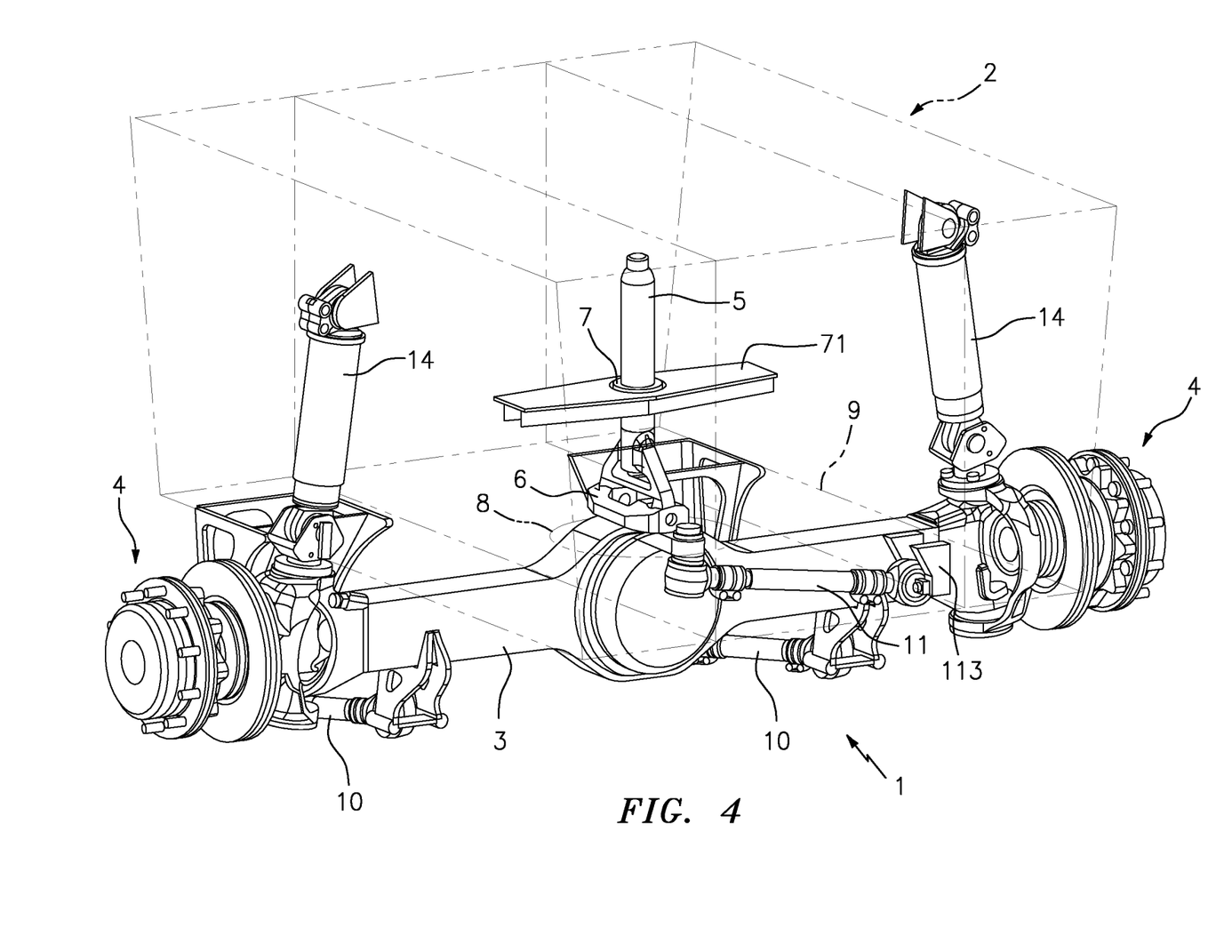
FIG. 4: shows an axle suspension according to the invention in the compressed condition.

FIG. 4 shows the axle suspension according to the invention as shown in FIG. 3 from a different viewing angle. Furthermore, the vehicle frame 2 now also is depicted in the Figure, in order to visualize an interaction of the individual components with the vehicle frame 2. The representation of this Figure shows a fully compressed condition in which the damping elements 14 have a condition maximally pushed together. The underside 9 of the vehicle frame 2 includes an opening 8 which is penetrated by the pendulum support 5. In the maximally compressed condition the pendulum support 5 not only penetrates the opening 8, but parts of the axle bracket 3 and the swivel bearing 6 also can be introduced into the interior of the vehicle frame 2.

Figure 5:
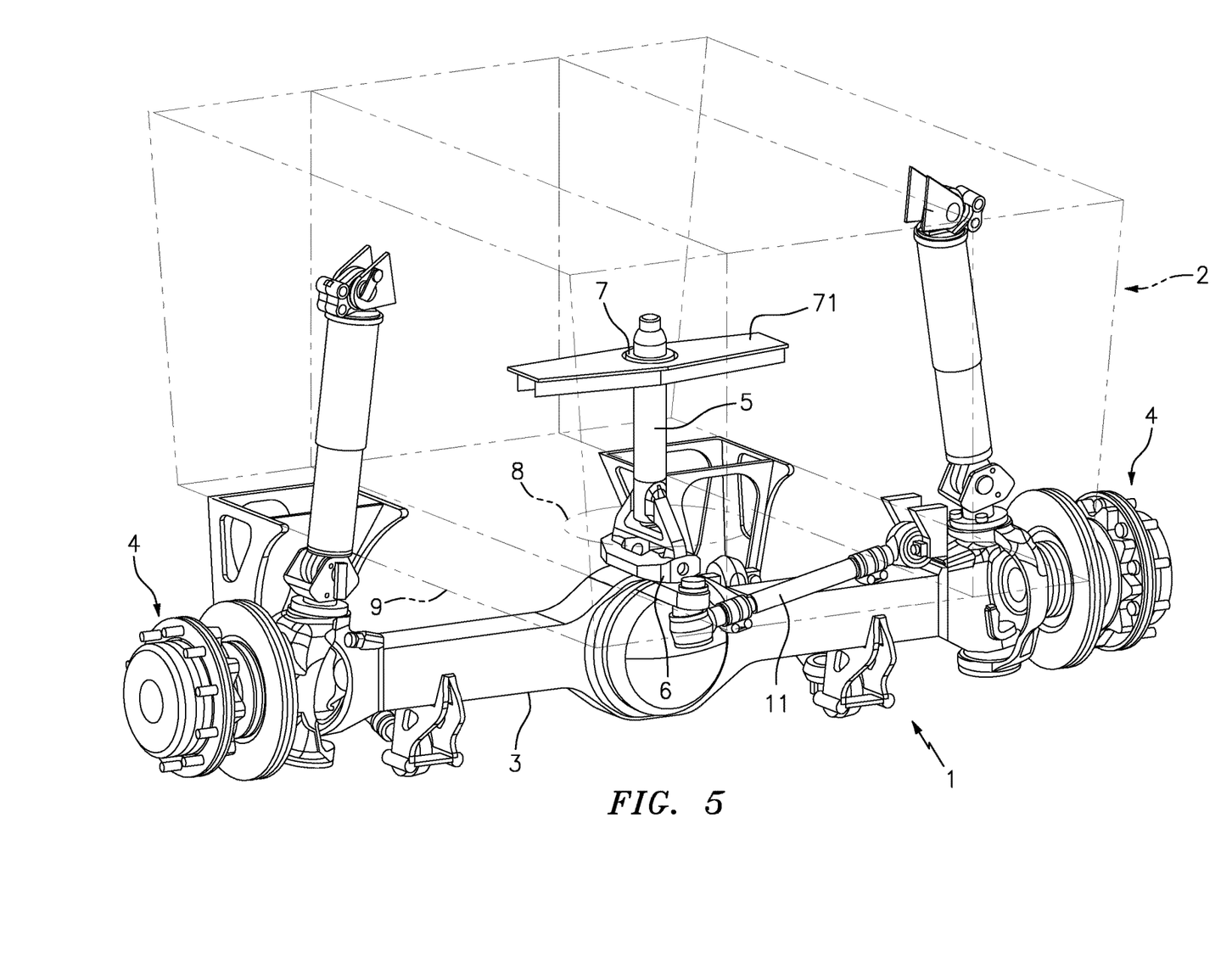
FIG. 5: shows an axle suspension according to the invention in the rebounded condition.

FIG. 5 shows a rebounded condition of the axle suspension according to the invention, which reveals that the pendulum support 5 penetrates the opening 8 of the underbody 9 of the vehicle frame 2. The self-aligning bearing 7, in which the pendulum support is accommodated in a portion facing away from the axle bracket 3, is firmly connected with the vehicle frame 2 via a console 71. The self-aligning bearing 7 provides for a swivel movement in all directions.

With this construction it is possible to further design the underbody 9 of the vehicle frame 2 in direction of the upper side of the axle bracket 3, so as to create more vehicle frame height.

By comparing FIGS. 4 and 5 it can be seen that the pendulum support accommodated in the interior of the self-aligning bearing is shiftably mounted in its longitudinal axis. A shifting movement in vertical direction of the pendulum support thus is possible. It should also be noted, however, that the pendulum support 5 can be mounted obliquely in longitudinal or transverse direction, for example when a reduced installation space is available. However, only the vertical part of the movement of the axle bracket 3 is essential during compression and rebound.

Figure 6:
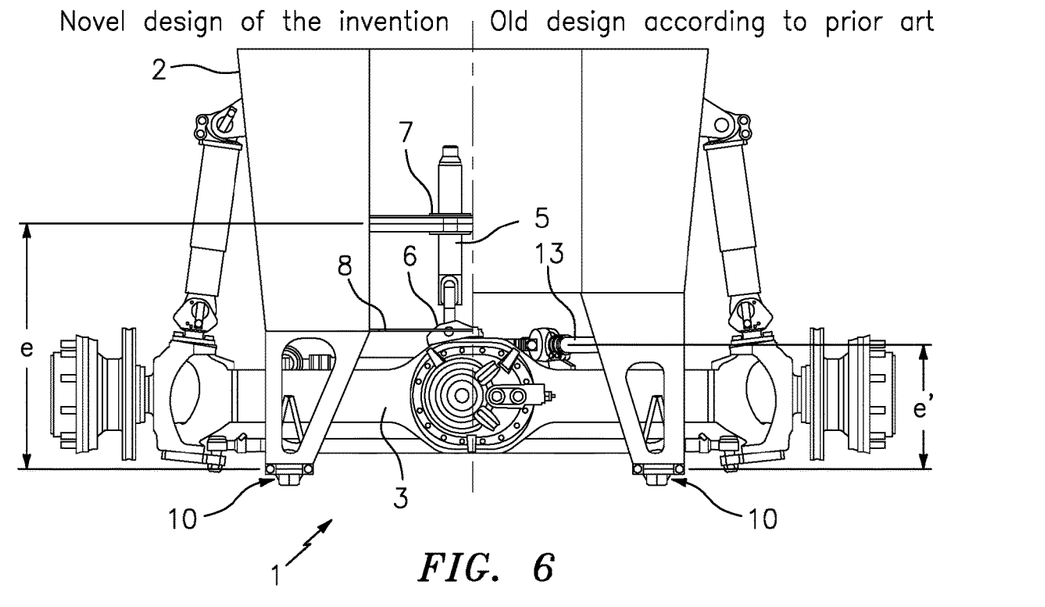
FIG. 6: shows a comparative representation of a design according to the invention as compared to a conventional design.

FIG. 6 shows a comparison of the design according to the invention as compared to the previous prior art. It can be seen that the vehicle frame underside 9 moves closer to the axle bracket 3, so that more vehicle frame height is created. This is due to the fact that there are no more diagonal links 13 arranged on the surface of the axle bracket 3 facing the frame underside, but their function on introduction of a torque caused by accelerating or braking is taken over by the pendulum support 5 in conjunction with the self-aligning bearing 7 which is firmly attached to the vehicle frame 2.

This not only contributes to a larger-volume vehicle frame, but also leads to smaller forces which are to be introduced into the vehicle frame. For the force to be introduced into the vehicle frame it namely is decisive how large the distance is in vertical direction from the lower steering rods 10 to the upper steering rods 13 or the self-aligning bearing 7.

As can be seen in FIG. 6, the distance e in the embodiment according to the invention is greater than the distance e' according to the prior art. Hence, when a torque produced in the axle bracket 3 by braking or accelerating is to be introduced into the vehicle frame 2, the forces to be introduced into the vehicle frame 2 are smaller due to the longer lever. As a result, the sheet thickness of the components used therefor can be reduced or a higher torque can be introduced into the vehicle frame.

Figure 7:
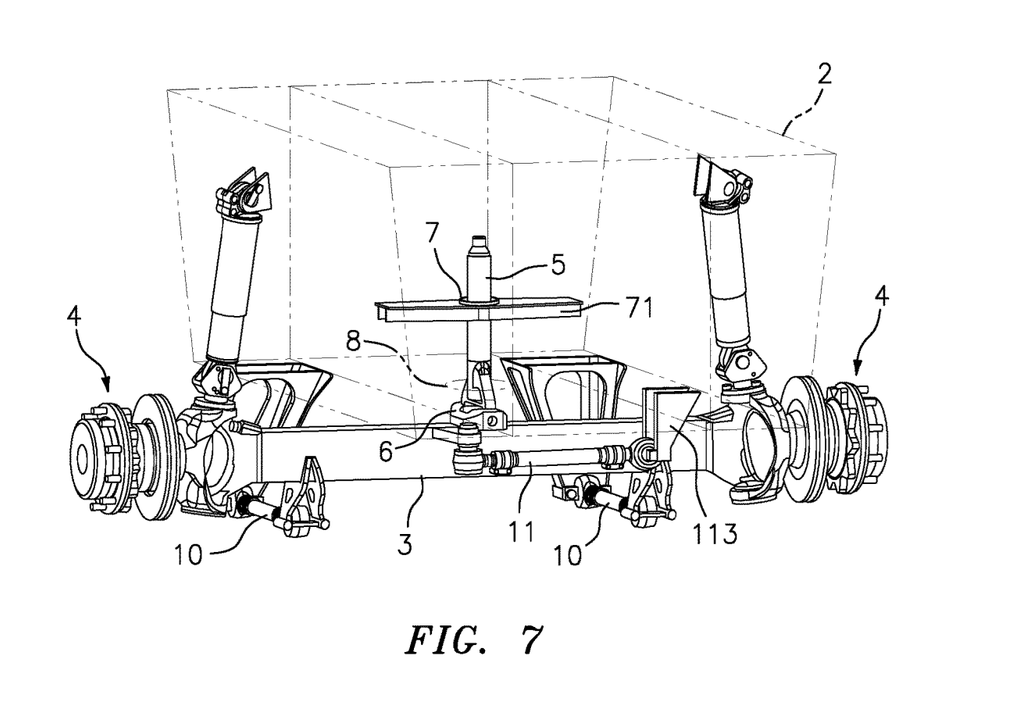
FIG. 7: shows an axle suspension according to the invention with reference to a non-driven axle.

FIG. 7 shows the invention on a non-driven axle bracket 3 on which the swivel bearing 6 is arranged towards the side facing the vehicle frame 2. It can be seen that the swivel axis of the swivel bearing 6 extends above the side of the axle bracket 3 facing the vehicle frame 2 and does not intersect the axle bracket 3.

Figure 8:
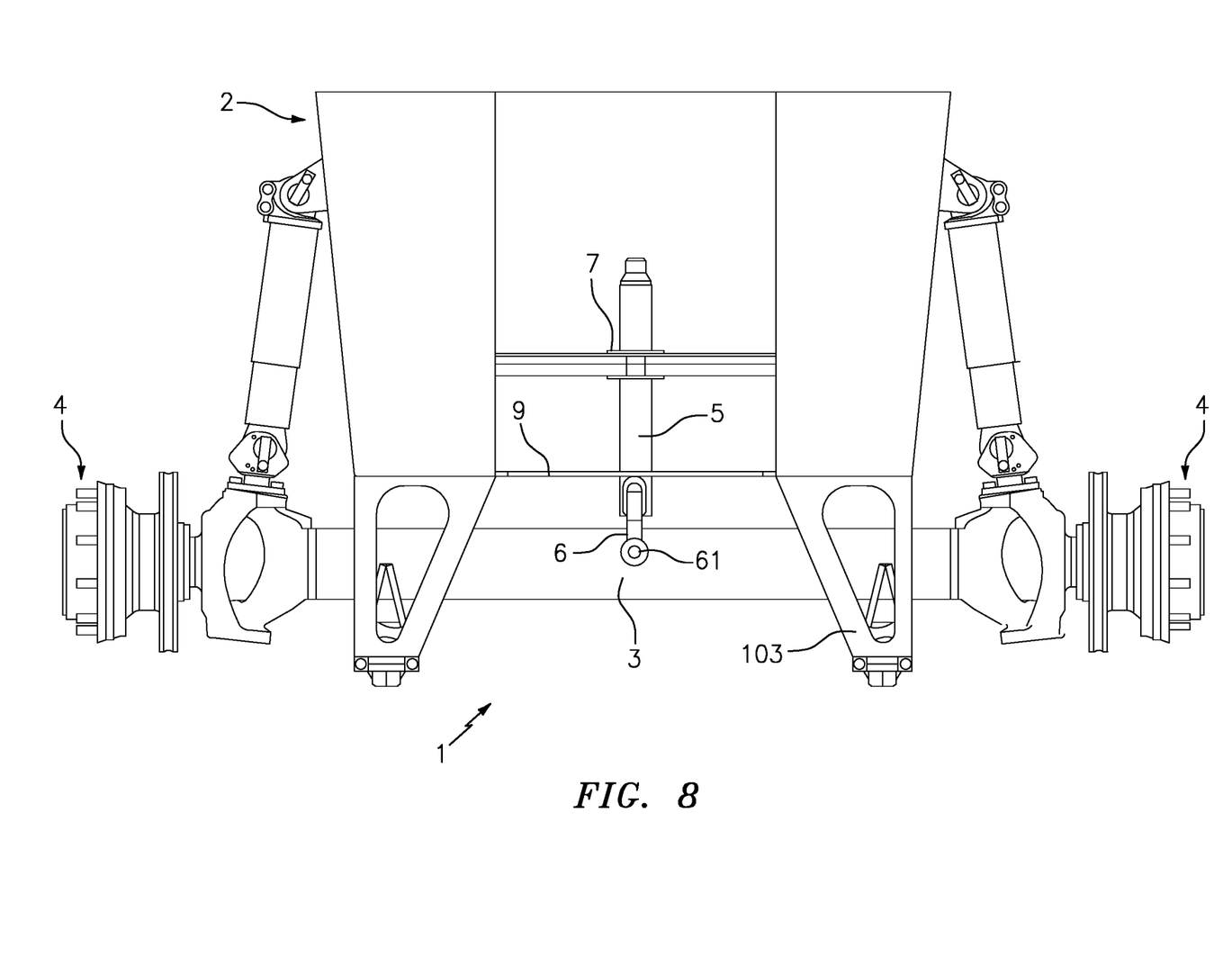
FIG. 8: shows a design of the axle suspension according to the invention with a swivel axis extending through the axle bracket.

FIG. 8 shows an embodiment of the invention which substantially corresponds with the embodiment shown in FIG. 7. In contrast thereto it can be seen that the swivel bearing 6 partly encloses the axle bracket 3, so that the swivel axis 61 intersects the axle bracket 3. This embodiment allows a smaller opening in the underbody of the vehicle frame.

Figure 9:
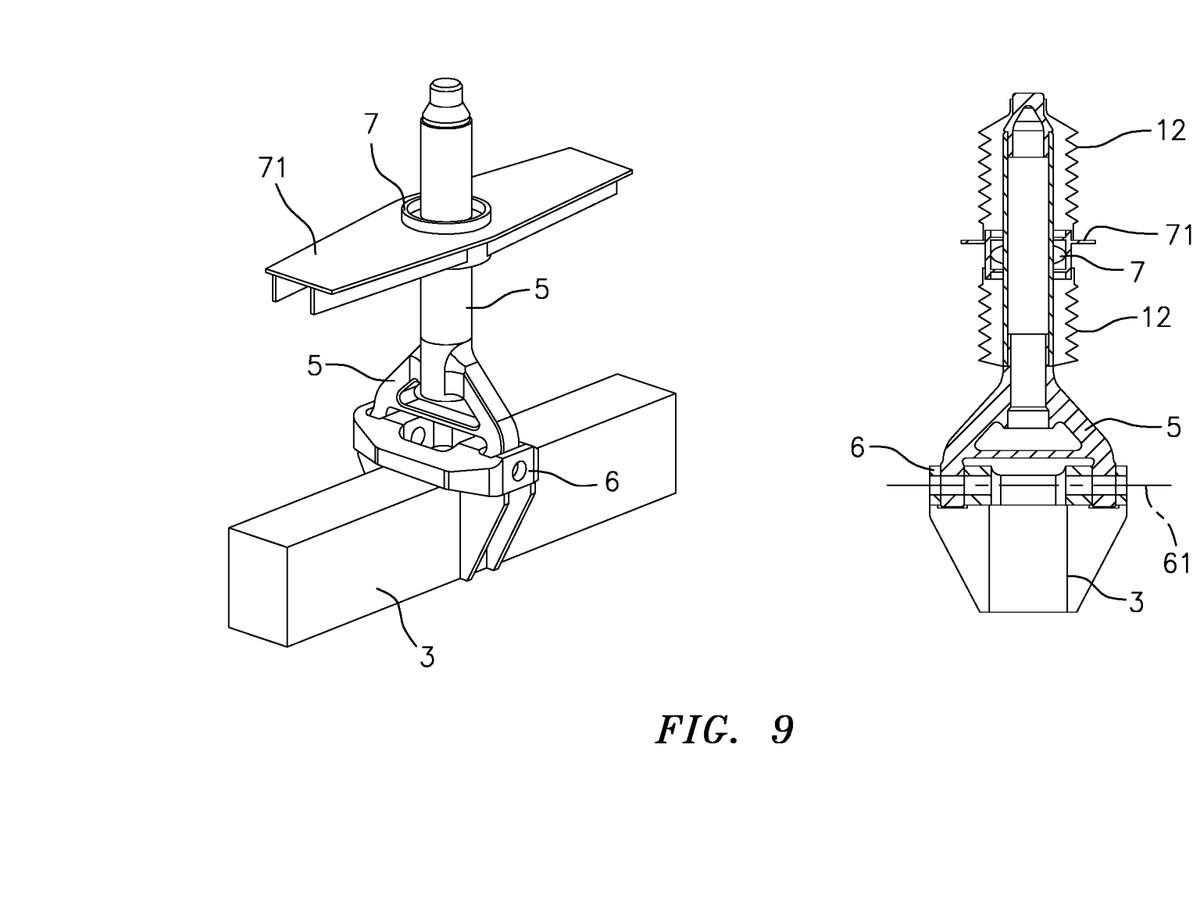
FIG. 9: shows a cut-out view of the pendulum support and its bearing as well as a sectional view thereof.

FIG. 9 shows the arrangement of the pendulum support 5 with the swivel bearing 6 on the axle bracket 3. It can be seen that due to the swivel axis of the swivel bearing 6, the axle bracket 3 only can perform a lateral tilting movement. The pendulum support 5 is inserted in the self-aligning bearing 7, which is accommodated in the console 71.

The sectional representation shows the axle bracket 3 with the swivel bearing 6 arranged on an upper side. There is also shown the swivel axis 61 which permits a relative movement of the axle bracket 3 to the pendulum support 4. There is also shown a protection device 12 which encloses the portion of the pendulum support 5. For example, this protection device 12 can be at least one bellows.

The likewise illustrated self-aligning bearing 7 also must permit certain tiling movements of the pendulum support 5.

Preferably, the longitudinal links 10 or 101 and the transverse links 13 are arranged horizontally in the middle position (also called level). During compression and rebound of the axle bracket 3 the longitudinal and transverse links describe circular arcs around their firm articulation points at the vehicle frame 2. The radii of these circular arcs each depend on the length of the links. As the pendulum support 5 is forcibly guided in the self-aligning bearing 7, the pendulum support slightly leans in transverse direction during compression and rebound.

In longitudinal direction, the axle 3 is offset laterally to the firm articulation point of the transverse link 13. The pendulum support 5 swivels about the swivel axis 61.

It is required that the self-aligning bearing 7 is carried along by these slight tilting movements of the pendulum support 5.

Figure 10:
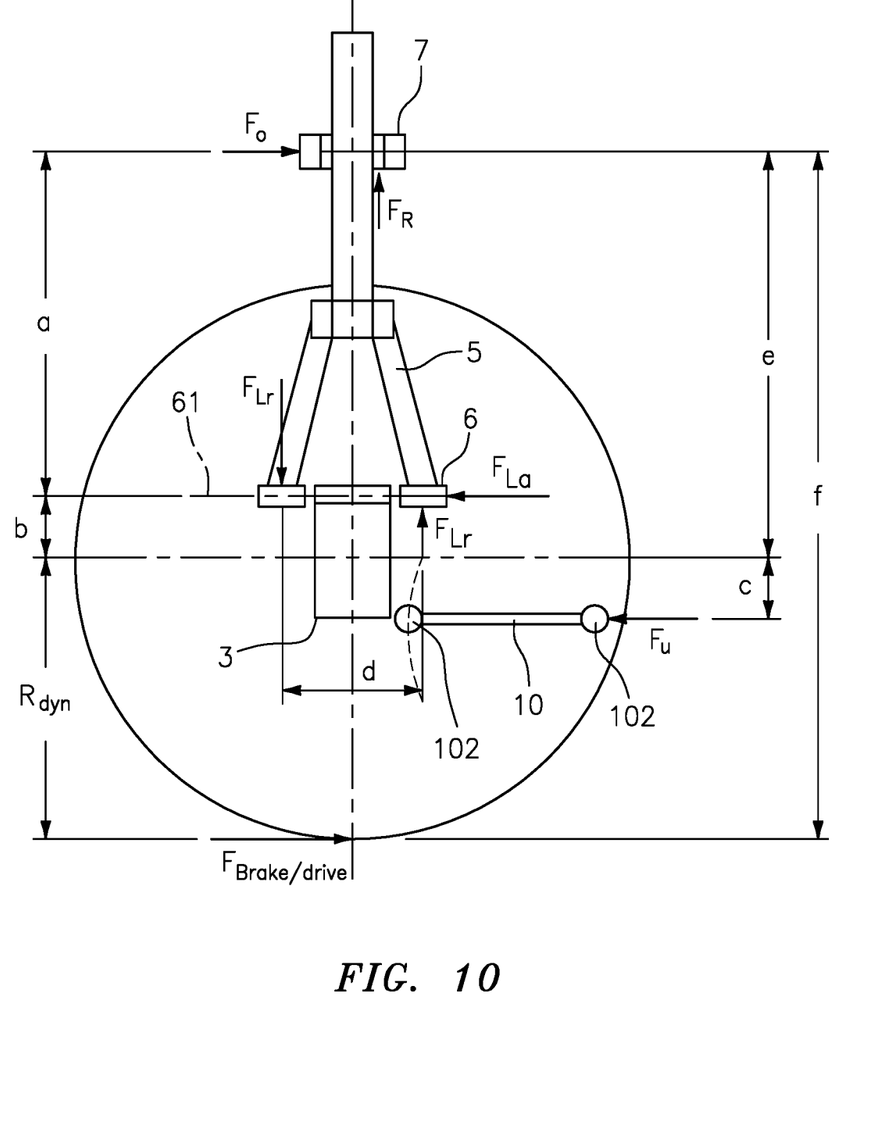
FIG. 10: shows a schematic representation with plotted forces resulting from brake and drive moments.

FIG. 10 shows a schematic representation with forces resulting from the brake and drive moments. The circle represents a wheel which on its underside is in contact with a ground plane. There is also schematically shown the axle bracket 3, the lower steering rod 10, the swivel bearing 6, the pendulum support 5 and the self-aligning bearing 7. An arrow designates the braking and driving force $F_{brake/drive}$, which exerts a certain moment on the axle bracket. This force is absorbed by the lower longitudinal links 10 with the force $F_U$ and by the self-aligning bearing 7 with the force $F_O$. The produced moment from the force $F_O$ and the lever arm a must be absorbed via the force couple $F_L$, in the two bearing points of the swivel axis 61. The distance d determines the magnitude of the force couple. As the distance e of the longitudinal links 10 to the self-aligning bearing 7 is distinctly larger than in the prior art (distance e' between upper and lower steering rods), the forces $F_U$ at the lower longitudinal links 10 become distinctly smaller with the same arrangement of the lower longitudinal links 10 in vertical direction. Thus, smaller components can be used, so that the weight can be reduced.

Figure 11:
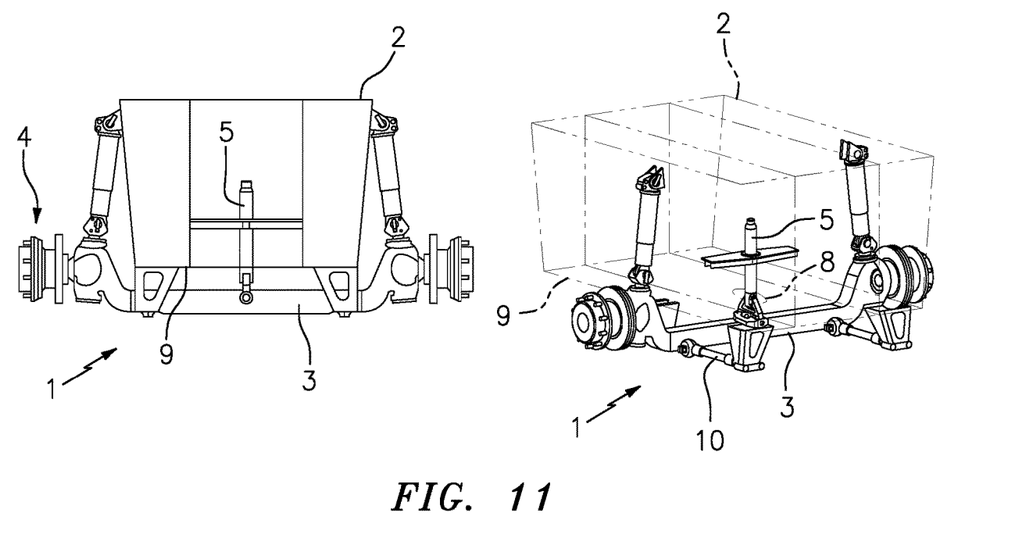
FIG. 11: shows an axle suspension according to the invention on a non-driven deeply cranked axle bracket in front and perspective views.

FIG. 11 shows a further embodiment of the present invention with a non-driven low-lying axle bracket 3. It is irrelevant for the invention whether the axle is a steered or non-steered or a driven (portal axle) or non-driven axle.

Figure 12:
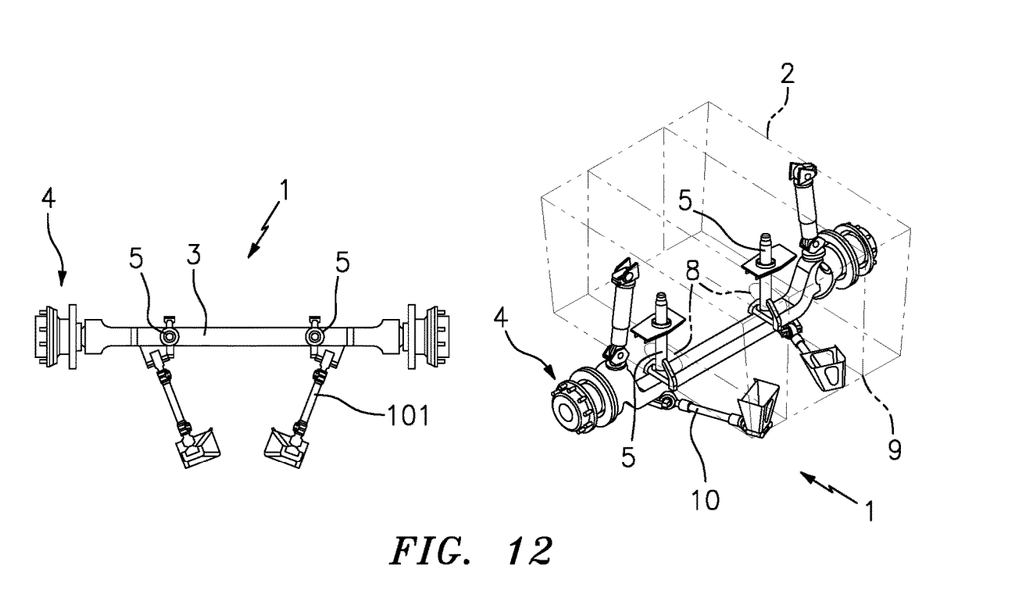
FIG. 12: shows an axle suspension according to the invention of a non-driven deeply cranked axle in a view from above and a perspective view with two pendulum supports and lower diagonal links.

FIG. 12 shows a variant of the invention in which two pendulum supports 5 are employed. This can be advantageous for example when a motor is to be mounted in the middle of the vehicle frame 2 and hence there is no room for a pendulum support 5 penetrating into the vehicle frame 2. In the view from above (on the left) it can also be seen that the lower longitudinal links 101 are designed as diagonal links, so that the previously used transverse link 11 no longer is required. The transverse forces then are absorbed via the lower diagonal link 101. In this solution it also is imaginable that the pendulum supports 5 are mounted on the outside of the vehicle frame. It is not absolutely necessary that the pendulum supports 5 are mounted within the vehicle frame. Accordingly, it is possible that the respective pendulum support is guided in a self-aligning bearing which is attached to an outer surface of the vehicle frame 2. The self-aligning bearing can be fixed with the outer surface of the vehicle frame 2 via a console 71.

The vertical and horizontal attachment of the lower longitudinal links 10 or the lower diagonal links 101 and of the self-aligning bearings 7 can be chosen freely. The distances decisively influence the longitudinal forces at the bearing points of the self-aligning bearing 7 with the force $F_O$ and the lower link $F_U$. However, the ground clearance always must be observed here. This likewise applies for the optionally present Panhard rod (transverse link).

It should also be noted that even with an only simple design, i.e. the presence of exactly one pendulum support 5, the pendulum support 5 with the self-aligning bearing 7 need not necessarily be mounted in the vehicle center or symmetrically to the longitudinal axis of the axle bracket 3.

When using two pendulum supports, the same likewise need not be arranged symmetrically to the vehicle center.

The invention claimed is:

1. An axle suspension (1) on a vehicle frame (2), comprising:
    an axle bracket (3) which in its longitudinal direction is arranged transversely to the vehicle frame (2) and at its longitudinal ends each is provided with a wheel carrier (4),
    a swivel bearing (6) mounted on the axle bracket (3),
    a pendulum support (5) which is situated on top of the swivel bearing (6) and connected with the axle bracket (3) via the swivel bearing (6), and
    a self-aligning bearing (7) attached to the vehicle frame (2) and with the pendulum support (5) extending upwardly through the self-aligning bearing (7), wherein
    the swivel bearing (6) has a swivel axis which extends parallel to the longitudinal axis of the vehicle frame (2), and
    the pendulum support (5) projects upwardly through the self-aligning bearing (7) in compressed state and retracts downwardly away from the self-aligning bearing (7) in rebounded state.

2. The axle suspension (1) according to claim 1, wherein the vehicle frame (2) includes an opening (8) in its frame underside (9), which is penetrated by the pendulum support (5).

3. The axle suspension (1) according to claim 2, wherein the swivel bearing (6) connected with the axle bracket (3) and the self-aligning bearing (7) attached to the vehicle frame (2) are arranged on different sides of the opening (8) of the frame underside (9).

4. The axle suspension (1) according to claim 1, wherein the self-aligning bearing (7) is designed to shiftably accommodate the pendulum support (5) along the longitudinal direction of the pendulum support (5).

5. The axle suspension (1) according to claim 1, wherein due to the connection of the pendulum support (5) with the axle bracket (3) via the swivel bearing (6), the axle bracket (3) is pivotable relative to the pendulum support (5) only about a swivel axis (61) parallel to the longitudinal direction of the vehicle frame (2).

6. The axle suspension (1) according to claim 1, further comprising lower steering rods (10) which with one of their ends are articulated to the axle bracket (3) and with the other end are connected with the vehicle frame (2), wherein preferably the lower steering rods (10) are articulated to the side facing away from the vehicle frame (2).

7. The axle suspension (1) according to claim 6, wherein the lower steering rods (10) are longitudinal links or diagonal links (101).

8. The axle suspension (1) according claim 1, further comprising at least one transverse link (11) coupled to the vehicle frame (2) through an articulation point (112) and to the axle bracket (3) through another articulation point (112), to limit a transverse offset of the axle bracket (3) relative to the vehicle frame (2).

9. The axle suspension (1) according to claim 8, wherein the transverse link (11) is a Panhard rod.

10. The axle suspension (1) according to claim 1, wherein the self-aligning bearing (7) includes a ball or roller guide for the pendulum support (5).

11. The axle suspension (1) according to claim 1, wherein the pendulum support (5) is arranged centrally on the axle bracket (3) in longitudinal direction by the swivel bearing (6).

12. The axle suspension (1) according to claim 1, wherein the swivel axis of the swivel bearing (6) extends above the axle bracket, in particular in a region between vehicle frame (2) and axle bracket (3), or penetrates the axle bracket (3).

13. The axle suspension (1) according to claim 1, wherein a plurality of pendulum supports (5) with their associated swivel bearing (6) and self-aligning bearing (7) are provided, and the plurality of pendulum supports (5) each are arranged on the axle bracket (3) via their swivel bearing (6).

14. The axle suspension (1) according to claim 1, further comprising at least one protection device (12) for the pendulum support, which encloses the portion of the pendulum support (5) to be shifted by the self-aligning bearing (7).

15. The axle suspension (1) according to claim 14, wherein the protection device (12) is at least one bellows.

16. The axle suspension (1) according to claim 1, wherein the axle bracket (3) is a driven or a non-driven axle.

17. A mobile crane with an axle suspension (1) according to claim 1.

18. The axle suspension (1) according to claim 1, wherein the swivel bearing (6) is mounted on top of the axle bracket (3).

19. The axle suspension (1) according to claim 1, wherein the swivel bearing (6) partly encloses the axle bracket (3) such that the swivel axis (61) intersects the axle bracket (3).

20. The axle suspension (1) according to claim 1, wherein the self-aligning bearing (7) is connected with the vehicle frame (2) through a console (71).

21. The axle suspension (1) according to claim 1, additionally comprising
- two said swivel bearings (6) mounted on the axle bracket (3), and
- two said pendulum supports (5), each situated on top of a respective swivel bearing (6) and extending upwardly through a respective self-aligned bearing (7).

* * * * *